United States Patent [19]
Quinn et al.

[11] Patent Number: 6,013,232
[45] Date of Patent: Jan. 11, 2000

[54] USE OF ULTRASOUND TO IMPROVE THE EFFECTIVENESS OF A PERMEABLE TREATMENT WALL

[75] Inventors: Jacqueline W. Quinn, Titusville; Christian A. Clausen, Orlando; Cherie L. Geiger, Geneva; Debra R. Reinhart, Maitland; Nancy Ruiz, Mims, all of Fla.

[73] Assignee: The United States of America as represented by the Administrator of the National Aeronautics and Space Administration, Washington, D.C.

[21] Appl. No.: 08/904,028

[22] Filed: Jul. 31, 1997

[51] Int. Cl.[7] .................................. C02F 1/70; A61L 2/02

[52] U.S. Cl. ..................... 422/128; 422/127; 422/900; 204/157.15; 210/747; 210/748; 210/757; 210/785; 210/170; 210/205

[58] Field of Search ..................... 422/128, 127, 422/900; 210/747, 748, 757, 170, 205, 785; 204/157.15

[56] References Cited

U.S. PATENT DOCUMENTS

| | | | |
|---|---|---|---|
| 3,231,513 | 1/1966 | Graves et al. | 252/413 |
| 4,086,184 | 4/1978 | Henry et al. | 252/414 |
| 4,992,614 | 2/1991 | Rodewald | 585/722 |
| 5,132,270 | 7/1992 | Wachholz et al. | 502/5 |
| 5,414,204 | 5/1995 | Hosono et al. | 588/210 |
| 5,597,265 | 1/1997 | Gallo | 405/128 |
| 5,750,036 | 5/1998 | Sivavek | 210/747 |

*Primary Examiner*—Robert J. Warden, Sr.
*Assistant Examiner*—Fariborz Moazzam
*Attorney, Agent, or Firm*—Beth A. Vrioni; Gary Borda; Diana M. Cox

[57] ABSTRACT

A method for increasing the effectiveness of a permeable treatment wall is described. The method includes the introduction of ultrasonic radiation in or near the wall. A permeable treatment wall is also described which has an ultrasonic radiation generating transducer in or near the wall. Permeable treatment walls are described as having either a well vertically extending into the wall, or a rod vertically extending into the treatment wall. Additionally, a method for adapting a permeable treatment wall to allow for the introduction of ultrasonic radiation in or near the wall is described.

11 Claims, 4 Drawing Sheets

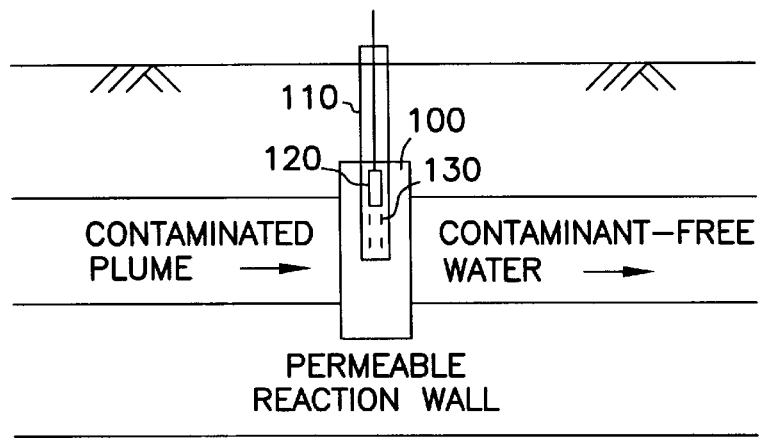
FIG. 5
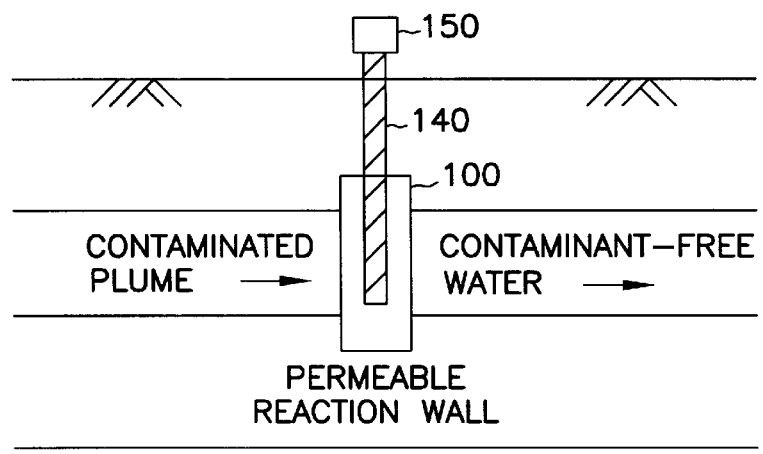
FIG. 6
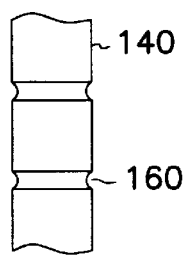 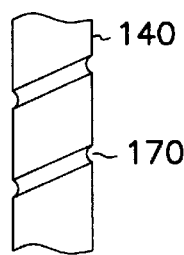 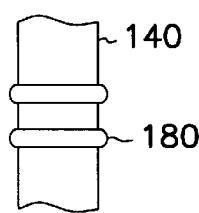 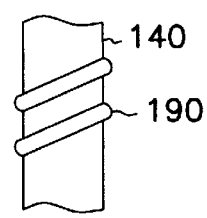
FIG. 7a    FIG. 7b    FIG. 7c    FIG. 7d

USE OF ULTRASOUND TO IMPROVE THE EFFECTIVENESS OF A PERMEABLE TREATMENT WALL

ORIGIN OF THE INVENTION

The invention described herein was made in performance of work under a NASA contract and is subject to the provisions of Public Law 96-517 (35 U.S.C. §202) in which the contractor has elected not to retain title.

BACKGROUND OF THE INVENTION

Halogenated solvents are used by a wide range of industries including dry cleaners, electronic equipment manufacturers, metal parts fabricators, insecticide and herbicide producers, military equipment manufacturers, etc. These solvents replaced petroleum derived mineral spirits and have distinct advantages because of their nonflammability. The persistence and mobility of these hydrocarbons in the subsurface was largely unanticipated, therefore historical disposal practices have led to widespread groundwater contamination. For example, trichloroethylene (TCE) has been found at more than 791 of 1300 National Priority List sites, primarily as a groundwater contaminant.

Chlorinated solvents fall into the category of dense non-aqueous phase liquids (DNAPLs). DNAPLs are heavier than water and therefore sink below the groundwater table until they encounter a layer through which they cannot pass. As they move downwards, DNAPLs leave behind a smearing trace of their migration pathway before eventually pooling on a confining unit or perhaps within a crevice of a fractured rock. Most DNAPLs can dissolve in aqueous environments, yet they do so in such small quantities that the original contaminant pool functions as a subsurface contamination source. The portion of the contaminant that does dissolve is typically at concentrations which exceed allowable groundwater standards.

Treatment of halogenated hydrocarbon contaminated groundwater is usually accomplished by pumping the groundwater to the surface and removing the contaminant through oxidation or air stripping. Pump-and-treat remediation systems have experienced limited success with respect to DNAPLs. Capillary pressure holds DNAPLs at residual saturation which can represent significant contamination. Consequently, removal of the contaminant from the subsurface is extremely time consuming, and therefore cleanup goals are rarely achieved. However, even though the pump-and-treat method is not a particularly successful remediation technology, it has proven to be a highly efficient tool for containment of the contaminant.

Because of the limited degree of success in remediating contaminated sites with technologies which attempt to remove the contaminant from the subsurface and pump it to a treatment system, recent efforts have focused on the physical, biological, or chemical treatment of these contaminants in situ.

A permeable treatment wall (PTW) is an alternative remediation technology which does not require groundwater to be pumped to a treatment facility. Instead contaminated groundwater is passively treated in situ. Permeable treatment walls, as shown in FIG. 1, are vertical cells which are installed subsurface near a contaminant source. PTWs are designed to have a greater permeability than the surrounding soils, and are typically constructed using a high permeability sand mixture comprising a zero-valent metal. PTWs have been successfully demonstrated in several field studies and offer potential economic savings over other halogenated solvent treatment methods.

It has been shown that zero-valent zinc and iron significantly enhanced the reductive dehalogenation of aliphatic compounds with iron being particularly attractive due to its low cost and availability. Batch tests in which aqueous solutions of a wide range of chlorinated methanes, ethanes, and ethenes were added to 100-mesh iron filings resulted in degradation rates that were three to seven orders of magnitude greater than natural abiotic rates reported in the literature. Generally, the rates increased with the degree of chlorination and with increasing iron surface area to solution ratio. The chlorinated products of degradation subsequently degraded to non-chlorinated compounds. Similar results have been obtained by Vogan et al. who propose that the corrosion of iron, while occurring independently of volatile organic compound degradation, likely provides the electron source needed for the reduction (Vogan, J. L. et al. "Evaluation of In Situ Groundwater Remediation by Metal Enhanced Reductive-Dehalogenation—Laboratory Column Studies and Groundwater Flow Modeling," presented at the 87th Annual Meeting and Exhibition of the Air Waste Management Association, Cincinnati, Ohio, June 19–24).

Although PTWs appear to represent a promising technology for renumerating contaminated groundwater, over time, researchers have noted that the effectiveness of many PTWs often decreases. This decrease in effectiveness may result from corrosion of the metal reagent utilized in the PTW, which reduces the amount of metal surface area available to participate in the reductive decontamination reaction. Alternatively, this decrease may result from the formation of particulate contaminates in or around the PTWs, which reduce the flow of contaminated water through the PTW. The term "particulate fouling" is used herein to describe this formation of particulate contaminates. Accordingly, there is a current need for methods to increase the effectiveness of PTW's which are functioning at sub-optimal levels as a result of corrosion on the metal reagent or as a result of particulate fouling.

SUMMARY OF THE INVENTION

The invention provides a method for increasing the effectiveness of a permeable treatment wall, comprising introducing ultrasonic radiation in or near the wall.

The invention also provides a permeable treatment wall comprising an ultrasonic radiation generating transducer in or near the wall. The permeable treatment wall can comprise a well vertically extending into the wall, the well having a lining and an opening such that the ultrasonic radiation generating transducer can be lowered into the opening. Alternately, the ultrasonic radiation generating transducer can comprise a rod vertically extending into the treatment wall, and an ultrasonic generator coupled to an upper end of the rod.

Additionally, the invention includes a method for adapting a permeable treatment wall to allow for the introduction of ultrasonic radiation in or near the wall, comprising inserting an ultrasonic radiation generating transducer into the subsurface in or near the wall, or inserting an ultrasonic radiation generating transducer into a well which is in or near the wall, and which is suitable for receiving the transducer. This latter method may further comprise a first step of constructing the permeable treatment wall.

BRIEF DESCRIPTION OF THE FIGURES

FIG. 5 illustrates a PTW where ultrasonic radiation is introduced into the area of a PTW using an in-well technique;

FIG. 6 illustrates a PTW where ultrasonic radiation is introduced into the area of a PTW using a rod; and FIGS. 7a–d illustrate some embodiments of the rod of FIG. 6.

DETAILED DESCRIPTION OF THE INVENTION

Figure 1:
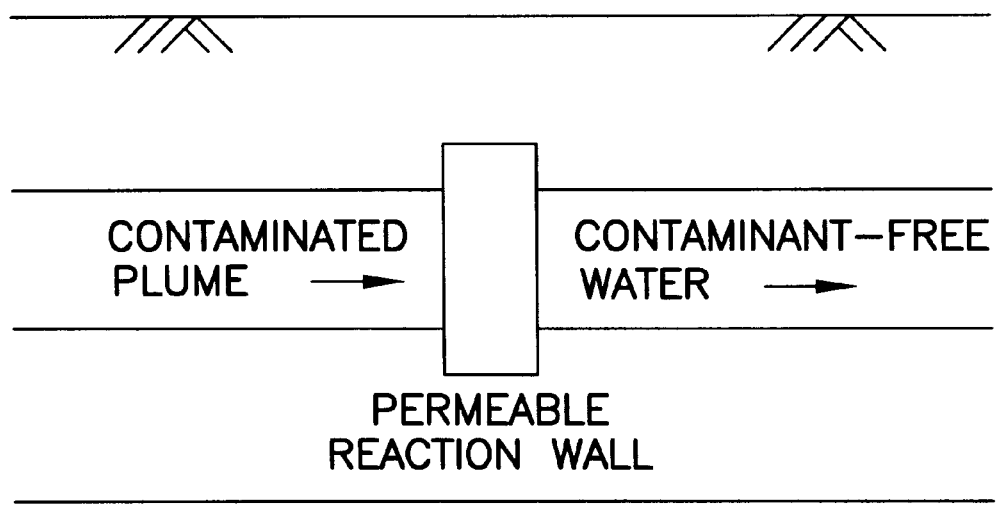
FIG. 1 illustrates a side view of an in situ PTW.

In the following detailed description of the preferred embodiments of the invention, reference is made to the accompanying figures which form a part hereof, and in which is shown by way of illustration specific embodiments in which the invention may be practiced. It is to be understood that other embodiments may be utilized and structural changes may be made without departing from the scope of the present invention.

As used herein, the phrase "near said wall" or "near the permeable treatment wall" means a position beyond the outer wall of the PTW but within a distance such that the ultrasonic radiation can produce a beneficial effect on the PTW.

Permeable Treatment Walls

A PTW is conceptually very similar to a concrete slurry wall, except, the functions are completely opposite. When used at a remediation site, slurry walls attempt to confine a contaminant plume, thereby preventing its spread to uncontaminated regions. Slurry walls are virtually impermeable by design. PTWs, on the other hand, are permeable and are designed so that larger volumes of water pass through the PTW than through the surrounding soils. As contaminated groundwater flows through a treatment wall, halogenated solvents are chemically altered to give acceptable alternative species. Emerging on the downstream side of the treatment wall is contaminant-free groundwater. No pumps or other aboveground treatment are required, as the natural groundwater gradient carries the contaminant through the treatment wall.

Permeable Treatment Wall Construction

PTWs can be constructed using a mixture of a zero valent metal and a high permeability bulking material. Alternatively, a PTW comprising pure zero valent metal can be used. Four PTW construction techniques have been tried in the field or proposed: 1) traditional excavation and backfilling, 2) slurry trenching, 3) deep-soil mixing, and 4) borehole augering.

Traditional excavation and backfilling can be relatively cheap and expeditious if the depth of the excavation is shallow. However, with deeper depths, the shoring of the trench's side walls becomes a safety issue and can significantly slow down the progress of the excavation. Also, when excavating contaminated wastes, the costs associated with the ultimate disposal of the removed soil can be prohibitive. As a result, the excavation and backfilling method may not be the most economical construction method for large PTWs.

Slurry trenching is most commonly used to construct deep, impervious walls below the subsurface. Typically, the walls are made of concrete and are intended to contain a migrating plume or to divert groundwater away from a contaminant source. During construction of slurry walls, a liquid mixture of water and bentonite (the slurry) is placed in an open trench to support the trench walls. After the excavation, a cement slurry is pumped into the trench to form a permanent wall.

The bentonite performs two functions when constructing a slurry trench. First, it thinly coats the sides of the trench creating what is called a filter cake. The filter cake minimizes slurry seepage outside of the excavation. Additionally, it provides a plane against which the weight of the slurry can push to counteract the lateral hydraulic forces of the surrounding groundwater, thus helping to prevent the trench's collapse.

The second function of the bentonite is to hold trench soil in solution without settling. The combined densities of the soil and bentonite create a slurry with a density greater than that of groundwater alone. The higher density slurry pushes against the sides of the trench wall helping to prevent its collapse.

When applying traditional slurry trenching construction techniques to permeable treatment walls, bentonite could not be used to perform the two aforementioned functions. The bentonite filter cake permanently creates an impermeable barrier, which defeats the objective of a PTW. However, a natural, biodegradable polymer can be substituted for the bentonite. Typically, the biopolymer maintains an effective filter cake for two weeks before dissolving in water. Once dissolved, the walls of the trench no longer prohibit water from passing through the treatment cell.

This particular method of PTW construction eliminates the time consuming process of installing side braces, which is typically required for the traditional excavation and backfilling method. Unfortunately, the excavated soil disposal cost for this construction method is also high. For civil engineering applications, both trenching techniques usually do not extend to depths beyond 25 m.

Deep-soil mixing is a relatively new construction technique to the environmental engineering field. Similar to trenching, deep-soil mixing traditionally increases soil strength and reduces permeability. Where it deviates significantly from trenching is that it does not excavate soils and therefore does not have the associated disposal costs. Deep-soil mixing uses a crane-supported set of leads that guides a series of hollow augers into the subsurface. A cement-based grout is injected through the augers as the mixing shafts penetrate the soil. Once the design depth is reached, the mixing shaft rotation is reversed and the mixing process is repeated as the auger shafts are brought to the surface, leaving behind a soilcrete column.

Deep-soil mixing may be applied to construct permeable treatment walls where sandy soils predominate. Instead of excavating soil down to design depths, only a portion of the excavation occurs; specifically in the upper few feet of the subsurface where there is little chance of finding halogenated contaminants. The mixing augers blend the existing sandy soils with zero valent metal shavings. The upper subsurface is removed to allow volume increases as the mixing action redistributes the soil within the column. Each mixed column of iron and native material then serves as a "pumpless well" drawing water into the column due to its higher hydraulic conductivity relative to the surrounding soil. To date however, deep-soil mixing rigs have not been used to prepare a PTW.

Borehole augering is used throughout the drilling industry for the installation of pumping and monitoring wells. As adapted for PTW construction, this construction method would involve augering to a design depth, filling the borehole through the hollow stem auger with the coarse sand and zero valent metal mixture before removing the auger and leaving the new treatment column behind. The disadvantage of this construction technique once again stems from the excavation of contaminated soil waste. On average, for a 14-inch outer diameter borehole, approximately one 55 gallon drum of contaminated soil is generated for each five feet of augering, adding significantly to the costs associated with this construction method.

All four of the aforementioned PTW construction methods require groundwater modeling to ensure adequate capture and retention of contaminated groundwater. For example, the borehole augering or deep-soil mixing technique require that an optimal staggering pattern be designed based upon groundwater modeling results. One construction method might be more applicable to a field site simply based upon hydrogeologic conditions, lithology, or current land usage. Cost, effectiveness, and ease of construction must ultimately determine the emplacement technique selected for permeable treatment walls.

Metals

Due to its relatively low cost, its ready availability, and its ease of handling, the metal most frequently used in the construction of PTWs is iron. A considerable amount of research has been conducted in order to define the kinetics of the chemical reactions responsible for reductive dechlorination by zero-valent iron. In anoxic or anaerobic environments, the chemical reactions involved are defined by corrosion chemistry, with the redox couple formed being:

$$Fe^0 \leftrightarrows 2e^- + Fe^{+2} \tag{1}$$

$Fe^0$ in this reaction functions as a reducing agent and is therefore capable of reductive dehalogenation of alkyl halides (RX).

$$RX + 2e^- + H^+ \to RH + X^- \tag{2}$$

The combination of Equations 1 and 2 is thermodynamically favorable under most conditions:

$$Fe^0 + RX + H^+ \to Fe^{+2} + RH + X^- \tag{3}$$

As illustrated by the following equations, water alone can serve as the oxidant in an anaerobic environment.

$$2H_2O + 2e^- \Leftrightarrow H_2 + 2OH^- \tag{4}$$

$$Fe^0 + 2H_2O \Leftrightarrow Fe^{+2} + H_2 + 2OH^- \tag{5}$$

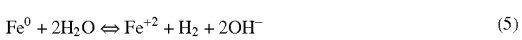

Although iron may be a preferred metal for use in the construction of PTWs, suitable metals useful in the construction of PTWs include any metal or combination of metals having a redox potential such that the reduction of the halocarbon or other contaminate is thermodynamically favorable. For example, other metals including palladium magnesium and zinc can be utilized in the construction of PTWs.

Ultrasound

The term ultrasound is applied to periodic stress waves, often loosely referred to as either sound or acoustical waves, that occur at frequencies above the limit of human hearing, or in excess of 20,000 Hz. Stress waves are aptly named because they create a deformation stress of the medium through which they are passing. At their upper extreme, ultrasonic frequencies are so high that their extremely short wavelengths are comparable to the agitation of molecules caused by heat. The sound waves initiate a process known as "cavitation." Cavitation includes the formation, growth, and implosive collapse of bubbles in a liquid. The collapse of such bubbles results in high speed solvent jets that can reach speeds of hundreds of meters per second. Upon impact with a corroded metal surface, these solvent jets can degrade the corrosive layer and yield a corrosion free metal surface. Additionally, these solvent jets are capable of degrading particulate matter.

In addition to the sonication effects that result from high power cavitation, ultrasound also produces lower power acoustic streaming in liquid media. This acoustic streaming is also effective to clean corrosion from metal surfaces and to degrade particulate matter.

Because the cavitational and acoustic streaming effects of ultrasound are useful for cleaning metal surfaces, the introduction of ultrasound in or near a PTW may result in removal of surface corrosion from metal reagent in the PTW, thereby increasing the effectiveness of the PTW. Additionally, since the cavitation and acoustic streaming effects of ultrasound are useful for degrading particulate matter, the introduction of ultrasound may be useful to increase the effectiveness of a PTW which is functioning at a sub-optimal level as a result of particulate fouling.

Because the beneficial effects of ultrasound result from cavitation or from acoustic streaming, the ultrasonic radiation must be introduced using a technique which is capable of producing cavitation or acoustic streaming under the conditions particular to a given PTW. The specific technique for introducing ultrasonic radiation at a given PTW can be determined by one skilled in the art, based on the type of PTW construction, as well as on the surface and subsurface conditions in the PTW vicinity. Two specific techniques useful for introducing ultrasonic radiation ion or near a PTW are described below. It is to be understood, however, that the methods described herein can be practiced using any technique which is capable of introducing ultrasound in the area of a PTW so that the effectiveness of the PTW is improved.

In-Well technique

As illustrated in FIG. 5, ultrasound could be transmitted into the area of a PTW 100 by means of an in-well technique, wherein a slotted pipe 1 10 is placed into the subsurface much like a monitoring well would be installed. An ultrasonic radiation producing transducer 120 may be lowered directly into the groundwater within an opening in the well, where the ultrasound can be generated. Some of the sound waves will permeate through the slots 130 in a lining of the well, but others must travel through the well material and then into the surrounding groundwater. By lowering the transducer into the well in vertical steps, the ultrasonic radiation may be delivered to specific portions of the PTW, or to the entire volume of the wall. The optimum size of the vertical steps can be determined by one skilled in the art based upon an estimate of the effective sphere of power within which volume acoustic streaming would occur. Preferably, a two foot radius sphere of PTW could be cleaned at each vertical step.

In order to minimize the power loss which results when the sound waves pass from the well, the slotted pipe may preferably be made of a material with a sound transfer velocity similar to that of ground water. For example, the speed of sound in distilled water is 1496 m/sec and in salt water is 1531 m/sec. Therefore, a well material with a sound transfer velocity in the range of 500 to 3000 m/sec may be useful. A well material with a sound transfer velocity which matches as closely as possible the sound transfer velocity of ground water is preferred. Therefore, polyethylene, with a sound transfer velocity of 1950 m/sec, would be preferable over Stainless steel which has a velocity of 5790 m/sec. It will be apparent to one skilled in the art that although the pipe has been referred to herein as "slotted," the slots function to facilitate the transfer of ultrasonic radiation from the transducer to the PTW and therefore, any suitable opening is acceptable. Additionally, it may also be possible to use a solid walled pipe in place of the slotted pipe described above.

In Ground technique

As illustrated in FIG. 6, ultrasonic radiation may also be introduced into the area of a PTW 100 using a grooved or turned rod 140, inserted directly into the subsurface, as a transducer. An ultrasound generating device 150 is coupled to an upper, exposed end of the rod for transferring ultrasonic radiation. Commercial ultrasound generating devices are often equipped with a horn made of a specific material. Such a device may be coupled to the rod in any manner suitable for the efficient transfer ultrasonic radiation. The material of a horn will transfer sound at a specific speed. In order to minimize power losses resulting from the transfer of sound from one material to another, the rod should possess a sound transfer velocity which is similar to the sound transfer velocity of the horn material. For example, if the horn is made of Titanium, then a rod material which matches this with respect to sound transfer would be Stainless Steel, 347 ($V_{steel}$=5790 m/sec $V_{titanium}$=6070 m/sec).

Another significant consideration is the spacing of either the turns or grooves. Preferably, the spacing is in increments of either one-half or equal to the wavelength generated by the ultrasound device. If this spacing is not adhered to, then subsequent sinusoidal waves from the generator will be canceled out by a reflected wave which did not get transferred into the groundwater. For example, if a 20 KHz power source is used, the wavelength of the ultrasonic radiation is approximately 0.285 meters. Therefore, the groove spacing along the rod should preferably be every 0.285 meters or every 0.142 meters.

As illustrated in FIGS. 7a–d, a variety of turn or groove designs are useful for practicing the invention. For example, the turns or grooves may be embodied as a series of horizontal grooves 160, a series of diagonal grooves 170, a series of horizontal raised ridges, or turns, 180, or a series of diagonal raised ridges 190. Ultrasonic radiation is transferred to the groundwater in the space falling between the turns or grooves in the rod. Accordingly, it will be apparent to one skilled in the art that any turn or groove design which allows for the transfer of the ultrasonic radiation is acceptable, and that the designs illustrated in FIGS. 7a–d are not limiting.

The invention will now be illustrated by the following non-limiting Examples.

EXAMPLES

Example 1

Batch Studies

Aqueous samples of trichloroethylene (TCE) were exposed to 20-hKz ultrasound in a 0.5-L Tedlar™ bag. Bag reactors were filled with 0.5 L deionized water and 0 to 2.5 g of iron, and purged with nitrogen. TCE was added in a 5000 ppm methanol solution to achieve final concentrations of 5 to 20 mg/L. Iron was washed with a ten-percent sulfuric acid solution prior to use to remove surface contamination. Bags were placed on a shaker table (160 shakes/min) to maintain well mixed conditions. Samples were removed periodically from the bags and analyzed for TCE. Zero-headspace conditions were maintained at all times.

Ultrasonic radiation was introduced using a 450-W Branson Ultrasonic water bath with an ultrasonic intensity of approximately 0.16 W/cm$^2$. Ultrasound treatment of bags containing iron consisted of one of the following categories: no sonication, sonication prior to introduction of TCE, or sonication after 14 days of contact with TCE. Length of sonication varied from 30 minutes to three hours. To minimize temperature impacts during sonication, water was either allowed to flow continuously through the ultrasound bath or the tank was emptied and refilled every 30 minutes. Reagents were obtained from Fisher Scientific, and were used as received. One hundred-mesh iron, obtained from Mallinckrodt Chemicals (Paris, Ky. 40361) was used. Control bags were constructed to evaluate possible sorption and ultrasound effects exclusive of iron treatment.

Results

Batch Studies. A first control, with no iron and no ultrasound exposure, was shaken for two weeks. A second control, contained no iron but was exposed to ultrasound for 30 minutes. TCE data were collected before ultrasound, immediately after exposure and then one hour later. For the control with no ultrasound exposure and no iron, less than two percent of TCE was lost over 14 days. TCE destruction during 30 minutes of sonication alone (no iron) also resulted in less than two percent loss. Fifty-five percent of the experiments were performed in duplicate.

To quantify the results, data were analyzed assuming first-order kinetics. Bags which received ultrasound treatment were monitored, for the purpose of developing rate constants, beginning 24 hours after sonication ended to prevent inclusion of TCE destruction which may have occurred during treatment. Concentrations were transformed to natural logarithms and results of linear regression between transformed concentrations and time were examined. TCE breakdown products, primarily cis-dichloroethane and ethene were found to increase over time, indicating destruction and not simply sorption of TCE onto the iron surface. Iron concentrations, length of sonication, half-lives for TCE disappearance, first order rate constants normalized per m$^2$ iron and length of monitoring period are provided in Table 1.

TABLE 1

Results of Batch Tests Using Iron and Ultrasound (US)

| Iron, g/L | US Exposure, hrs | Half-Life, days | 1st Order Rate Constant, min$^{-1}$ ($\times 10^6$)* | Days Monitored Before/After US |
|---|---|---|---|---|
| 0 | 0 | — | No Loss$^+$ | 14/0 |
| 0 | 0.5 | — | No Loss$^+$ | 0/14 |
| 1 | 0 | 36.2 | 7.56 | 28/0 |
| 1 | 0.5 | 31.2 | 8.61 | 0/28 |
| 3 | 0 | 24.6 | 3.71$^+$ | 28/0 |
| 3 | 0.5 | 21.9 | 4.17 | 0/28 |
| 5 | 0 | 16.2 | 3.69$^+$ | 28/0 |
| 5 | 0.5 | 13.5 | 4.06 | 14/14 |
| 5 | 1 | 5.3 | 10.3$^+$ | 0/28 |
| 5 | 2 | 5.2 | 10.5 | 14/14 |
| 5 | 3 | 5.2 | 10.6$^+$ | 14/14 |

*normalized per m$^2$ iron
$^+$ represents an average of duplicates

Comparison of first order rate constants normalized per m$^2$ of iron suggest that the introduction of ultrasound to reactors containing iron increases reaction rates significantly. Sonication for one-half hour appears to increase reaction rates an average of about 12 percent compared to similar iron concentrations which received no treatment, regardless of when the ultrasound treatment occurred relative to TCE exposure. However, rate constants nearly tripled (average increase of 184 percent) after a minimum of one hour of ultrasound treatment. While rate constants continued to increase with increasing length of treatment, the difference in rate increases between one hour and three hours of treatment was less than four percent.

Ultrasound has been shown to effectively degrade organic compounds, including halocarbons. Much of this work was performed using a horn or probe configuration for the energy delivery system, similar to that used in the current column study, however, some studies used small volumes of samples (25 to 100 mL) and irradiated for periods of up to 3 hours by ultrasonicators operating at a high frequency (such as 530 kHz) or high ultrasonic intensity (approximately 75 W/cm$^2$) Based on these reports, sonication of a large volume (500 mL) of liquid in an ultrasonic bath operating at 20 kHz with relatively low ultrasonic intensity (0.16 W/cm$^2$) under the conditions described in the Examples herein would not likely provide sufficient energy to degrade significant amounts of TCE. In addition, evaluation of reaction rate constants is delayed sufficiently to exclude these effects. The improvement in TCE destruction is therefore assumed to be due to removal of corrosion products which have accumulated on the iron surface. Scanning electron microscopy (SEM) has also shown that iron "aged" in 200 ppm TCE for 30 days exhibited significant calcification on the surface as compared to "unaged" iron. Following ultrasound application, the SEM showed that the surface was visibly cleaner.

Example 2

Column Studies

Column studies were conducted in an up-flow mode using four different combinations of iron and native aquifer material: 50-mesh iron particles, from Science Kit and Boreal Laboratories, acid-washed heated cast-iron chips from the Peerless Corp., unwashed Peerless iron, and acid-washed heated cast-iron chips from Master Builder's Supply (Streetsboro, Ohio). The Peerless and Master Builder's Supply iron chip mesh sizes were distributed as follows: 43 percent of the iron was retained on mesh size 20 and 40 percent on mesh size 40. The remaining fraction of the iron particles included iron dust.

Four Plexiglass columns (10 cm×one-meter) were charged with 20 weight-percent iron and 80 weight-percent construction-grade sand. A fifth control column was charged with only sand. Unbuffered solutions of 15 mg/L TCE in deionized water was allowed to flow through the columns at a rate of 4.7 mL/min. Samples were collected at multiple depths along the columns to monitor TCE destruction. Ultrasound was introduced to the 50-mesh iron column at 50 percent maximum power using a 15.9 mm-diameter stainless-steel long-ship auger drill big inserted 15 cm through the bottom of the column and threaded for connection to a Fisher Sonic Dismembrator Model 300 (Watt) ultrasonicator.

Analysis. TCE was analyzed following EPA Method 624. Each sample was injected with 5.0 μL of internal standard, bromochloromethane. A five-ml portion of the sample was transferred to a purge vial. Helium was bubbled through the sample for a period of eleven minutes to transfer the TCE onto a Vocarb 3000 trap. The desorbtion time from the trap was four minutes at 250° C. and the trap bake time was seven minutes at 260° C. A Hewlett-Packard gas chromatograph (Model 5890) equipped with a 0.25-mm id, 60-m long Vocol capillary column was programmed for a three-minute hold at 60° C., and a 15° C./min rise to 180° C. held for three minutes.

Iron surface area was measured using a Porous Material, Inc. BET Sorptometer. The 100-mesh iron surface area was found to be 1.76 m$^2$/g.

Results

The results from the column studies are shown in Table 2. The increase in half-lives over time suggests that gradual but significant iron aging has occurred. Comparison of TCE removal by washed and unwashed Peerless iron showed that washed iron is ten times more reactive than unwashed. Surprisingly, little difference was initially observed among the three types of iron used.

TABLE 2

Results of Column Studies

| Column | TCE Half-Life, min | No. of Pore Volumes Passing through Column |
|---|---|---|
| 50–mesh Iron | 240 | 1–20 |
|  | 289 | 200–225 |
|  | 618 | 300–315 |
| Peerless Iron | 246 | 50–60 |
|  | 720–805 | 80–140 |
| Master Builder Iron | 225 | 50–60 |
|  | 800 | 80–140 |
| Unwashed Peerless | 2567 | 50–60 |

Figure 2:
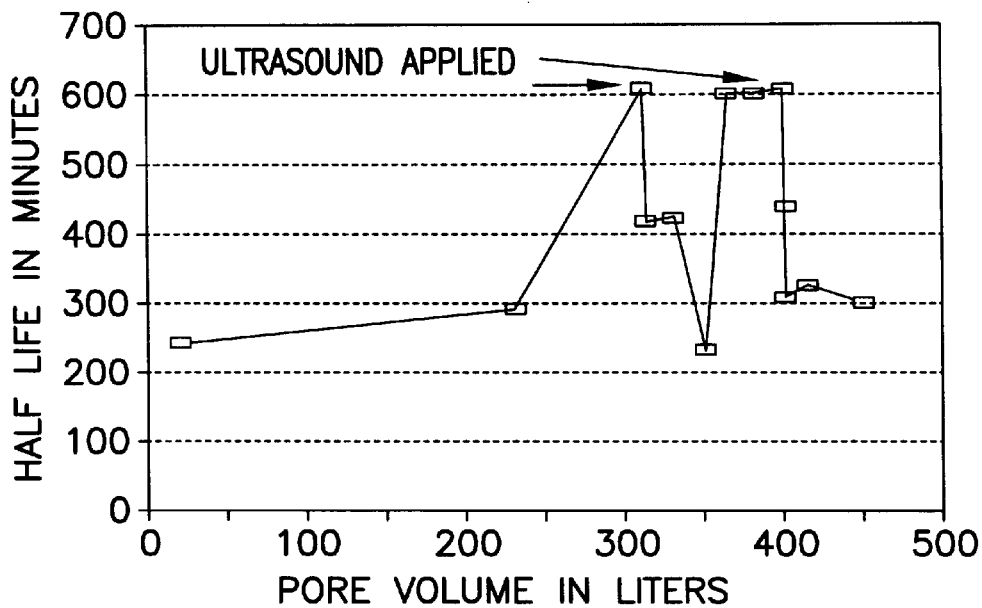
FIG. 2 illustrates the effects of ultrasound on TCE half life in the column studies of Example 2.

The effects of ultrasound on the 50-mesh iron column were explored once deterioration in column performance (increased half-life) was observed over an extended period of time (300 plus pore volumes). Ultrasound was introduced at over a one-hour period. An immediate reduction in half-life was observed over the next 30 pore volumes. Unfortunately, air was drawn into the feed bag shortly thereafter, introducing oxygen to the column. The half-life immediately returned to the pre-ultrasound level, presumably due to the build-up of oxidized iron products on the iron surface. Ultrasound was again introduced, and, as can be seen in FIG. 2, half-lives fell dramatically and remained at low levels.

Half-lives calculated for TCE disappearance over the lower section of the column, which contains the probe, and the upper section of the column before and after sonication indicate that impacts of sonication extend beyond the end of the probe. Prior to sonication, the lower half of the column, which receives the highest concentrations of TCE, exhibited a half-life approximately 1.5 times that of the upper section. After sonication, both half-lives dropped significantly. The lower section exhibited a half-life decrease of approximately 70 percent, while the half-life for the upper section of the column dropped 22 percent. Although certainly not to the degree of the lower section, the iron in the upper section of the column appears to have benefitted from sonication.

During the ultrasound application, dispersion of brown colloidal material was observed (iron precipitates). This material tended to be removed further up the column with the advective flow. No increase in pressure drop along the column was experienced after ultrasound treatment which would suggest plugging of the column. Some short-circuiting of TCE down the column was measured during ultrasound introduction. Short-circuiting was not observed for a lithium tracer added to the TCE solution. Therefore, it is assumed that TCE volatilization occurred as a result of local high temperatures induced by ultrasound. Once ultrasound was discontinued, the TCE movement through the column returned to normal.

Example 3

TCE was studied at initial concentrations of up to 20.0 ppmv in batch reactors. The batch reactor consisted of a 3 neck-1 L round bottom flask, kept at constant temperature.

Figure 3:
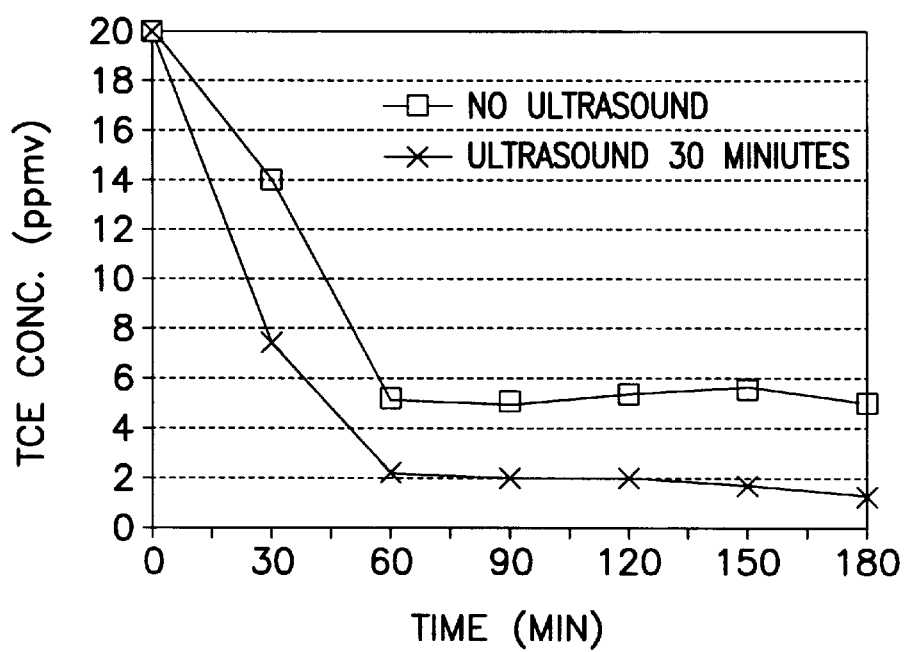
FIG. 3 illustrates TCE destruction with iron (100 mesh) as measured in Example 3.
Figure 4:
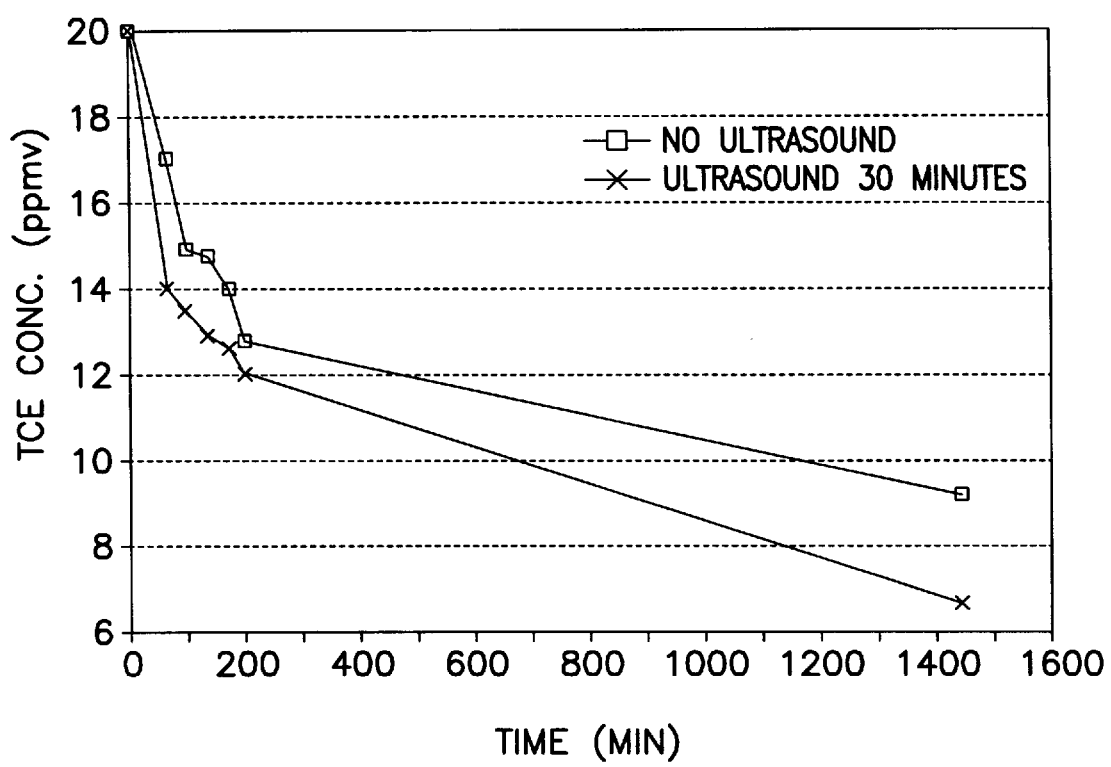
FIG. 4 illustrates TCE destruction with magnesium metal as measured in Example 4

An ultrasound probe was inserted through the center neck and the tip positioned just above the metal (1.0 g iron of various surface areas or magnesium strips). Experiments were conducted with iron metal (various surface areas) or magnesium metal, or a 50–50 mixture of the two, both with and without ultrasound. Also, experiments were done with ultrasound alone (no metal) and a control (no metal or ultrasound). FIG. 3 and FIG. 4 show results for TCE destruction efficiency both with and without ultrasound for iron and magnesium metals, respectively.

All publications, patents, and patent documents are incorporated by reference herein, as though individually incorporated by reference.

What is claimed is:

1. A method for increasing the effectiveness of a permeable treatment wall comprising introducing ultrasonic radiation in or near said permeable treatment wall using an in-well technique.

2. The method of claim 1 wherein the well comprises a slotted pipe or a solid pipe placed into the subsurface in or near the permeable treatment wall.

3. The method of claim 2 wherein the pipe is made of a material with a sound transfer velocity similar to that of ground water.

4. The method of claim 2 wherein the pipe is made of polyethylene.

5. A method for increasing the effectiveness of a permeable treatment wall comprising introducing ultrasonic radiation in or near said permeable treatment wall using a grooved rod.

6. A method for increasing the effectiveness of a permeable treatment wall comprising introducing ultrasonic radiation in or near said permeable treatment wall using a turned rod.

7. A permeable treatment wall comprising a well vertically extending into the wall, the well having a lining and an opening, and an ultrasonic radiation generating transducer in the well.

8. The permeable treatment wall of claim 7 wherein the lining comprises slots for ultrasonic radiation to pass through.

9. The permeable treatment wall of claim 7 wherein the lining has a sound transfer velocity approximately that of groundwater.

10. A permeable treatment wall comprising a rod vertically extending into the treatment wall, and an ultrasonic generator coupled to an upper end of the rod.

11. The permeable treatment wall of claim 10 wherein the rod includes a grooved or turned exterior surface.

* * * * *